US008795783B2

(12) United States Patent
Kotov

(10) Patent No.: US 8,795,783 B2
(45) Date of Patent: Aug. 5, 2014

(54) PREPARATION OF LAYER-BY-LAYER MATERIALS AND COATINGS FROM IONIC LIQUIDS

(75) Inventor: Nicholas A. Kotov, Ypsilanti, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 0 days.

(21) Appl. No.: 13/393,341

(22) PCT Filed: Aug. 31, 2010

(86) PCT No.: PCT/US2010/047313
§ 371 (c)(1),
(2), (4) Date: Feb. 29, 2012

(87) PCT Pub. No.: WO2011/026104
PCT Pub. Date: Mar. 3, 2011

(65) Prior Publication Data
US 2012/0156389 A1    Jun. 21, 2012

Related U.S. Application Data

(60) Provisional application No. 61/275,528, filed on Aug. 31, 2009.

(51) Int. Cl.
*B05D 5/00* (2006.01)

(52) U.S. Cl.
USPC ...... 427/407.1; 427/402; 427/240; 427/372.2

(58) Field of Classification Search
CPC .......... B05D 1/005; B05D 1/36; B05D 3/002; B05D 3/10; B05D 7/52; B05D 7/56; B05D 2350/30
USPC .............................. 427/402, 407.1, 240, 372.2
See application file for complete search history.

(56) References Cited

U.S. PATENT DOCUMENTS

| | | | |
|---|---|---|---|
| 2,960,706 A | 11/1960 | Dunham | |
| 3,120,805 A | 2/1964 | Simon | |
| 5,201,951 A | 4/1993 | Shigeta | |
| 5,208,111 A * | 5/1993 | Decher et al. | 428/420 |
| 5,238,713 A | 8/1993 | Sago et al. | |
| 5,472,502 A | 12/1995 | Batchelder | |
| 5,518,767 A * | 5/1996 | Rubner et al. | 427/259 |
| 5,827,602 A | 10/1998 | Koch et al. | |
| 5,861,061 A | 1/1999 | Hayes et al. | |
| 6,460,424 B1 | 10/2002 | Dubas et al. | |
| 6,565,763 B1 * | 5/2003 | Asakawa et al. | 216/56 |
| 6,585,936 B1 | 7/2003 | Shah | |
| 6,689,338 B2 | 2/2004 | Kotov | |
| 6,805,904 B2 | 10/2004 | Anders et al. | |
| 6,827,966 B2 | 12/2004 | Qiu et al. | |
| 6,878,767 B2 | 4/2005 | Kenig | |
| 7,045,087 B2 | 5/2006 | Kotov | |
| 7,329,415 B2 | 2/2008 | Lally et al. | |
| 7,438,953 B2 | 10/2008 | Kotov et al. | |
| 7,534,610 B1 | 5/2009 | Kotov et al. | |
| 7,666,461 B2 | 2/2010 | Qiu et al. | |
| 7,763,715 B2 | 7/2010 | Hecht et al. | |
| 7,863,038 B2 | 1/2011 | Motamedi et al. | |
| 7,897,876 B2 | 3/2011 | Tsotsis et al. | |
| 7,901,706 B2 | 3/2011 | Lally et al. | |
| 8,080,183 B2 | 12/2011 | Kotov et al. | |
| 8,159,235 B2 | 4/2012 | Lynch et al. | |
| 8,318,859 B2 | 11/2012 | Amano et al. | |
| 2002/0139268 A1 | 10/2002 | Emery et al. | |
| 2003/0021982 A1 | 1/2003 | Kotov | |
| 2003/0027011 A1 | 2/2003 | Kotov et al. | |
| 2005/0008676 A1 | 1/2005 | Qiu et al. | |
| 2005/0013775 A1 | 1/2005 | Kotov | |
| 2006/0090271 A1 * | 5/2006 | Price et al. | 8/490 |
| 2006/0240727 A1 | 10/2006 | Price et al. | |
| 2006/0240728 A1 | 10/2006 | Price et al. | |
| 2007/0003595 A1 | 1/2007 | Wang et al. | |
| 2007/0023957 A1 | 2/2007 | Kotov et al. | |
| 2007/0224264 A1 | 9/2007 | Antipov et al. | |
| 2007/0231918 A1 * | 10/2007 | Zeng | 436/141 |
| 2009/0041825 A1 | 2/2009 | Kotov et al. | |
| 2009/0121872 A1 | 5/2009 | Lynch et al. | |

(Continued)

FOREIGN PATENT DOCUMENTS

| | | | |
|---|---|---|---|
| CA | 2046391 A1 * | 8/1992 | |
| WO | WO 01/72878 | 10/2001 | |

(Continued)

OTHER PUBLICATIONS

International Search Report and Written Opinion of the ISA for PCT/US2010/047313, ISA/KR, mailed May 30, 2011.
Canavati, Javier, et al., "MRoller: Final Report. Layer-by-Layer Assembly of Nano-Composites," available at http://deepblue.lib.umich.edu/bitstream/handle/2027.42/62492/ME450%20Fall2008%20Final%20Report%20-%20Team%2025%20-%20Assembly%20of%20Nanocomposites.pdf?sequence=1, pp. 1-66 (Dec. 11, 2008) (downloaded on Mar. 21, 2013).
Chiarelli, P.A., et al., "Controlled Fabrication of Polyelectrolyte Multilayer Thin Films Using Spin-Assembly," Advanced Materials, vol. 13, No. 15, pp. 1167-1171 (Aug. 2001) (published online Aug. 6, 2001) (Abstract only).

(Continued)

*Primary Examiner* — William Phillip Fletcher, III
(74) *Attorney, Agent, or Firm* — Harness, Dickey & Pierce, P.L.C.

(57) ABSTRACT

A method for making a layered material can include providing a substrate having a surface with at least one region having a charge and forming layers by sequentially contacting the at least one region with a first solution and a second solution. The first solution comprises a first layering material in an ionic liquid and the second solution comprises a second layering material in a second ionic solution. The first and second layering materials can have a chemical affinity to each other. The first layering material and/or the second layering material can include polyelectrolytes, polymers, carbon nanotubes, or combinations thereof.

22 Claims, 8 Drawing Sheets

(56) References Cited

U.S. PATENT DOCUMENTS

| | | | |
|---|---|---|---|
| 2009/0240001 A1* | 9/2009 | Regner | 525/95 |
| 2010/0098902 A1 | 4/2010 | Kotov et al. | |
| 2010/0189913 A1 | 7/2010 | Kotov et al. | |
| 2010/0248361 A1 | 9/2010 | Lasky et al. | |
| 2010/0273667 A1 | 10/2010 | Kotov et al. | |
| 2011/0186685 A1 | 8/2011 | Tsotsis et al. | |
| 2011/0250427 A1 | 10/2011 | Kotov et al. | |
| 2012/0156389 A1 | 6/2012 | Kotov | |
| 2012/0276278 A1 | 11/2012 | Qiu et al. | |

FOREIGN PATENT DOCUMENTS

| | | |
|---|---|---|
| WO | WO 01/93363 | 12/2001 |
| WO | 03-001575 A2 | 1/2003 |
| WO | 2009-062146 A2 | 5/2009 |

OTHER PUBLICATIONS

Cho, J., et al., "Fabrication of Highly Ordered Multilayer Films Using a Spin Self-Assembly Method," Advanced Materials, vol. 13, No. 14, pp. 1076-1078 (Jul. 2001) (published online Jul. 12, 2001) (Abstract only).

Decher, Gero, "Fuzzy Nanoassemblies: Toward Layered Polymeric Multicomposites," Science, vol. 277, No. 5330, pp. 1232-1237 (Aug. 29, 1997).

Earle, Martyn J., et al., "Diels-Alder reactions in ionic liquids. A safe recyclable alternative to lithium perchlorate-diethyl ether mixtures," Green Chemistry, 1, pp. 23-25 (1999).

Gordon, Charles M., "New developments in catalysis using ionic liquids," Applied Catalysis A: General, vol. 222, Nos. 1-2, pp. 101-117 (Dec. 2001).

Hagiwara, Rika, et al., "Room temperature ionic liquids of alkylimidazolium cations and fluoroanions," Journal of Fluorine Chemistry vol. 105, No. 2, pp. 221-227 (Sep. 2000).

Krogman, K.C., et al., "Automated Process for Improved Uniformity and Versatility of Layer-by-Layer Deposition," Langmuir, vol. 23, No. 6, pp. 3137-3141 (2007) (published online Feb. 9, 2007).

Tomita, Shigeru, et al., "Layer-by-layer assembled thin films composed of carboxyl-terminated poly(amidoamine) dendrimer as a pH-sensitive nano-device," Journal of Colloid and Interface Science, vol. 326, No. 1, 35-40 (Oct. 1, 2008) (published online Jul. 3, 2008) (Abstract only).

Wong Shi Kam, Nadine, et al., "Electrical Stimulation of Neural Stem Cells Mediated by Humanized Carbon Nanotube Composite Made with Extracellular Matrix Protein," Nano Letters, vol. 9, No. 1, pp. 273-278 (2009) (published online Dec. 23, 2008) (Abstract only).

International Preliminary Report on Patentability issued on Mar. 6, 2012 in related PCT International Application No. PCT/US2010/047313 (published as WO 2011/026104).

* cited by examiner

PREPARATION OF LAYER-BY-LAYER MATERIALS AND COATINGS FROM IONIC LIQUIDS

CROSS-REFERENCE TO RELATED APPLICATIONS

This application claims the benefit of U.S. Provisional Application No. 61/275,528, filed on Aug. 31, 2009. This application is a National Stage Application of International Application No. PCT/US2010/047313, filed Aug. 31, 2010. The entire disclosures of each of the above applications are incorporated herein by reference.

FIELD

The present disclosure relates to methods and compositions for preparing various composite materials including films, coatings, and laminates using a layer-by-layer technique.

INTRODUCTION

This section provides background information related to the present disclosure which is not necessarily prior art.

Layer-by-layer (LBL) assembly can be used in construction of multilayer thin films. Examples of LBL assembly include deposition of thin films of oppositely charged polymers or polymers otherwise having affinity for each other. Successive adsorption results in alternating layers of the oppositely charged polymers or polymers having affinity for each other. In some instances, LBL assembly can be used to prepare thin films of nanoparticles or other materials in a like fashion. The simplicity and universality of the technique are complemented by the high quality films produced thereby, making the LBL process an attractive alternative to other thin film deposition techniques. LBL can be applied to a large variety of water-soluble compounds and is suitable for the production of stratified thin films in which layers of nanometer thickness can be organized in a specific predetermined order.

LBL films can be assembled on a solid substrate material, such as a glass slide or silicon wafer. Deposition of the film material onto the substrate can be performed in an iterative manner, made possible by the overcompensation of surface charge which often takes place when polyelectrolytes and other high molecular weight species are adsorbed on a solid-liquid interface. In one example of a layer-by-layer assembly process, following preparation of the substrate, a film is deposited on the substrate by repeating a process including: 1) coating the substrate with an aqueous solution of polyelectrolyte; 2) washing with solvent; 3) coating with an aqueous dispersion of nanoparticles; and 4) washing again with solvent. This process can be repeated many times, depending on the number of layers required to obtain the specific properties of the desired material. Coating of each layer can be accomplished using various means, including immersion or dip-coating, spin coating, and spreading using pressurized air.

While LBL methods are used for the electrostatic deposition of pairs of oppositely charged polyelectrolytes, such methods may also be applied to thin films of inorganic nanomaterials, biopolymers, and nanocarbons. For example, various physical and chemical interactions can be utilized to promote the formation of multilayer films, including hydrogen-bonding, metal-ligand interaction, charge-transfer interaction, covalent attachment, sol-gel reaction, molecular recognition, and hydrophobic interaction among others.

The LBL process is often used for applications employing polyelectrolytes that are soluble in aqueous-based systems. In some cases, organic-based media can be used. However, the use of aqueous-based media or organic-based media can limit the selection of layering materials for films and other structures and can limit the application of films produced using LBL processes to those polyelectrolytes soluble in aqueous or organic solvents.

SUMMARY

The present technology includes methods and compositions that relate to layer-by-layer assembly of a material using ionic liquids comprising one or more layering materials. Methods include applying a first ionic liquid comprising a first layering material to a surface to form a first layer and applying a second ionic liquid comprising a second layering material to the first layer to form a second layer. The first ionic liquid and the second ionic liquid can be further applied in an alternating fashion to form a plurality of layers; e.g., from 3 layers to 100 or more layers. A third ionic liquid comprising a third layering material can also be applied to the second layer to form a third layer. Likewise, additional ionic liquids can be added in successive or alternating fashion to make first, second, third, etc. layers where each can include a different layering material, or the same or different ionic liquids comprising layering materials can be repeatedly layered in successive fashion. Use of ionic liquids in which layering materials are dissolved, dispersed, or at least partially solubilized makes possible the use of layering materials that are otherwise poorly soluble in aqueous and/or organic solvents amenable to layer-by-layer assembly. For example, polyelectrolytes can be effectively incorporated into the LBL process by using ionic liquids even though one might expect a charge screening effect when using an ionic liquid.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 5:
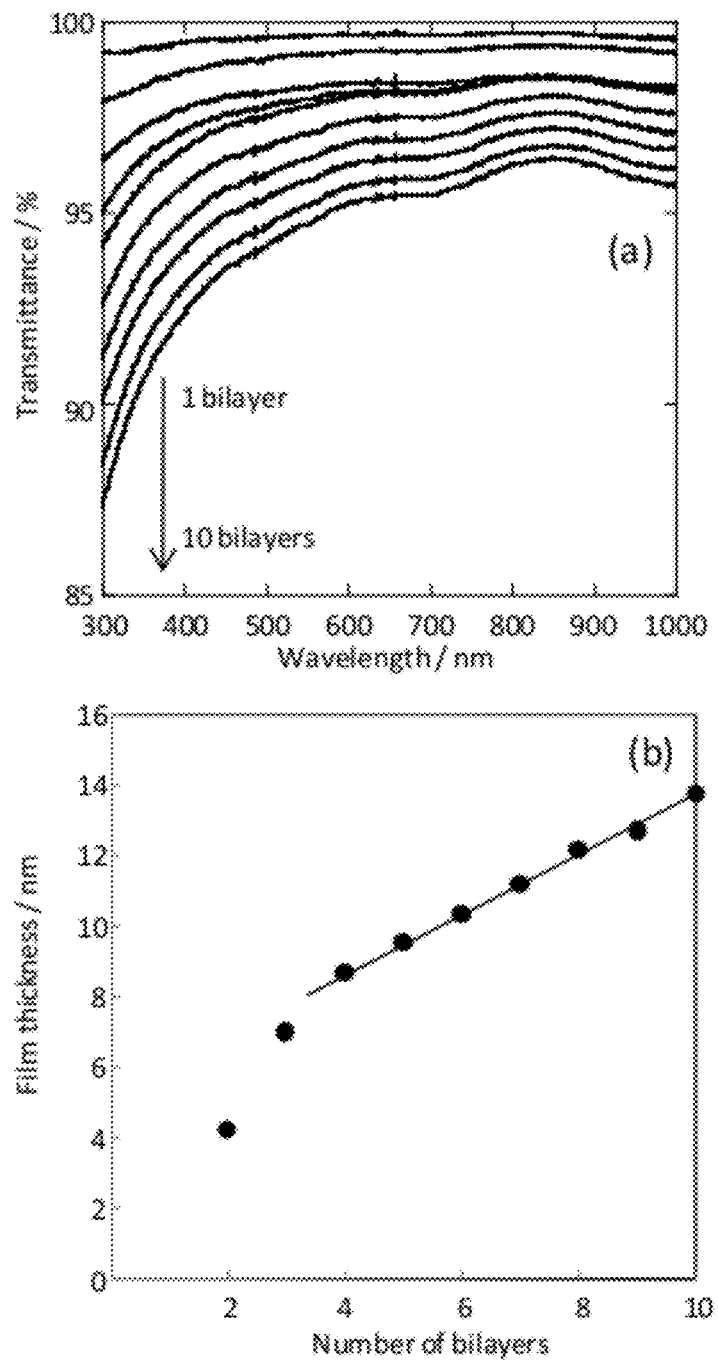

FIG. 5(a) depicts a graph illustrating a transmission spectra of polyvinylalcohol/single walled carbon nanotubes-polysulfonatestyrene (PVA/(SWNT-PSS)) multilayers on a glass slide. The observed spectra can be measured after each SWNT-PSS deposition. The Spectrum of glass slide was subtracted from each spectrum. FIG. 5(b) depicts a graph representing thickness growth curve of PVA/(SWNT-PSS) multilayer film versus bilayer number measured by ellipsometry.

Figure 6:
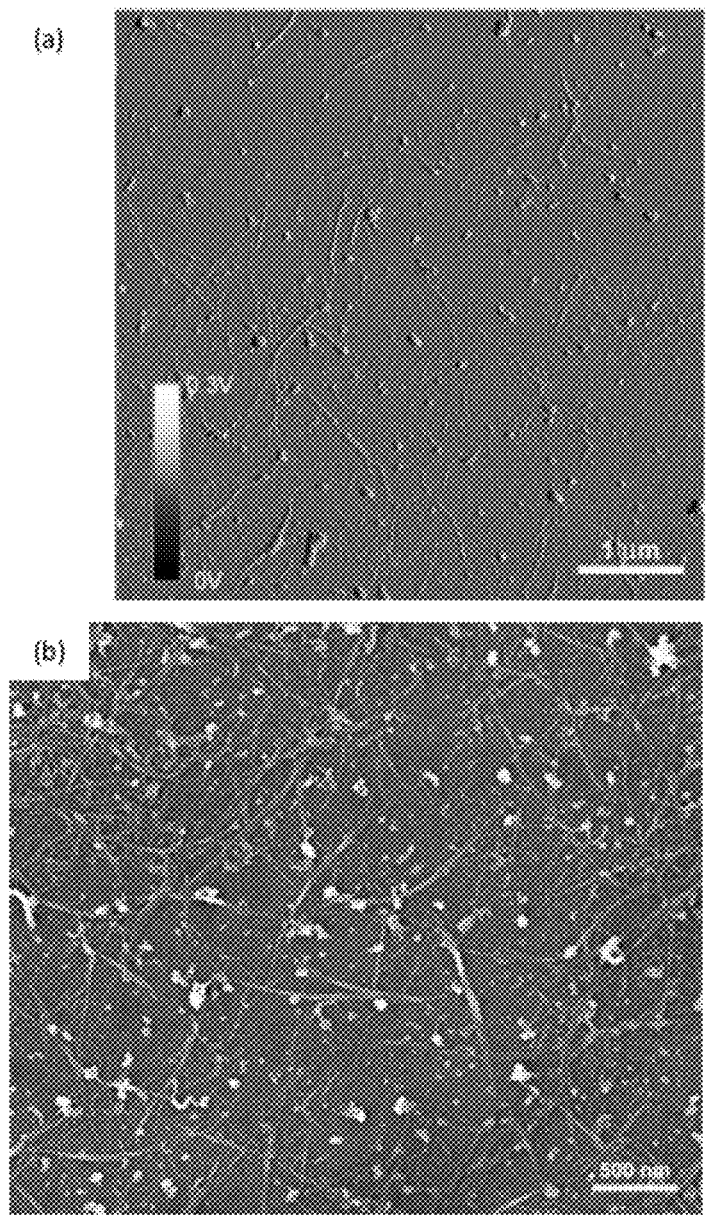

FIG. 6(a) illustrates an atomic force microscopy image of a single bilayer of PVA/(SWNT-PSS) film disposed on a substrate. FIG. 6(b) depicts a scanning electron micrograph (SEM) image of a [PVA/(SWNT-PSS)]$_{10}$ bilayer film.

Figure 7:
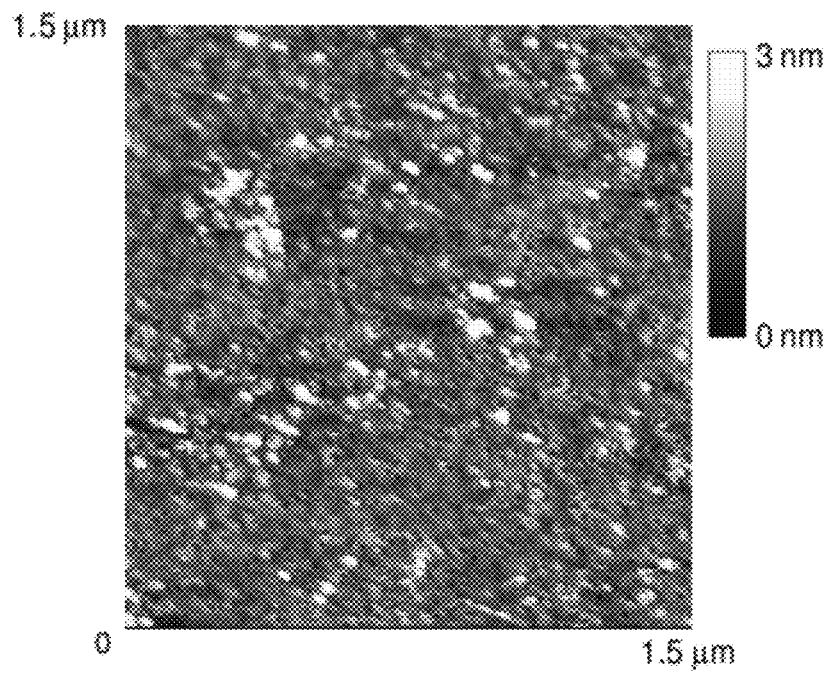

FIG. 7 illustrates an atomic force microscopy image of a regenerated cellulose film spin-deposited on a PEI layer on a silicon wafer.

Figure 8:
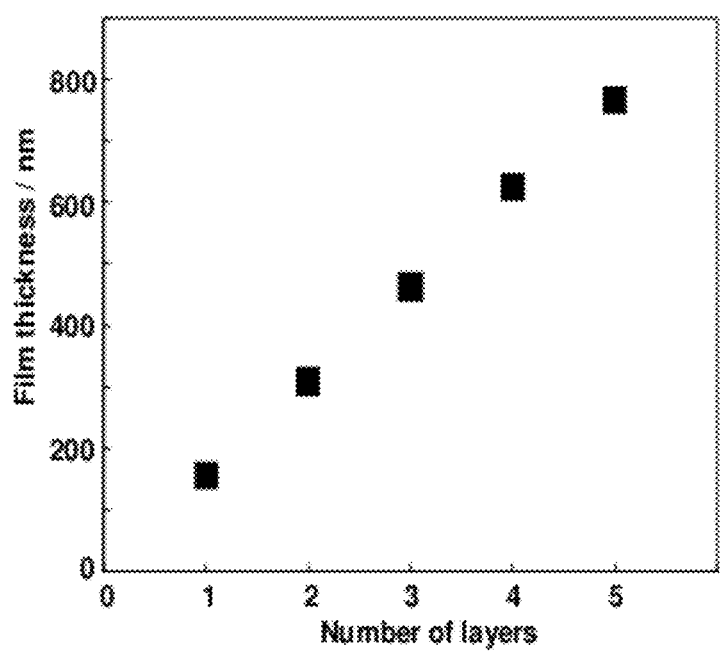

FIG. 8 depicts a graph representing the relationship between the number of layers disposed and film thickness growth of a regenerated cellulose film measured by ellipsometry.

Figure 9:
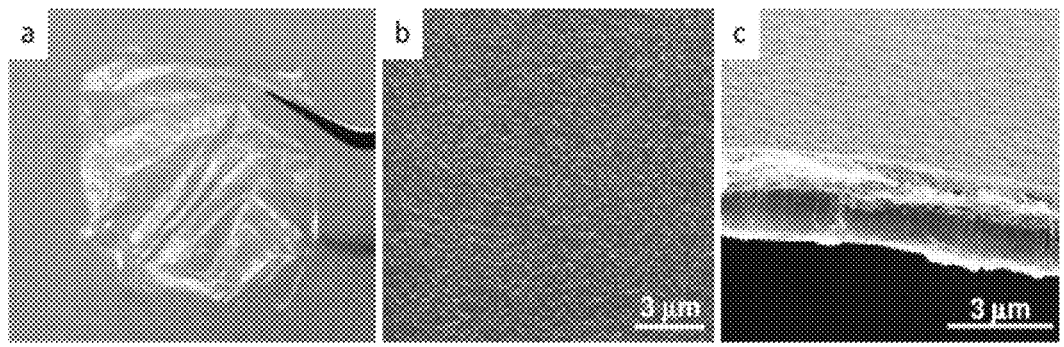

FIG. 9(a) illustrates a photograph of a surface and FIG. 9(b) depicts a scanning electron micrograph (SEM) of a surface of a free-standing regenerated cellulose film using the methods of the present technology. FIG. 9(c) depicts a scanning electron micrograph (SEM) of a cross-section of a free standing regenerated cellulose film.

Figure 10:
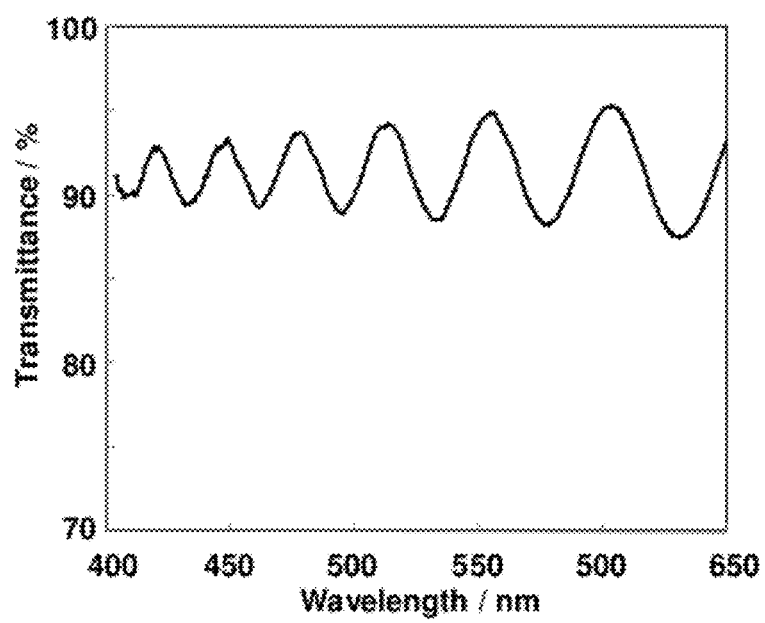

FIG. 10 depicts a graph of transmittance versus wavelength as represented by an optical transmittance spectrum of a free-standing regenerated cellulose film measured by a microscopic spectroscopy.

Figure 11:
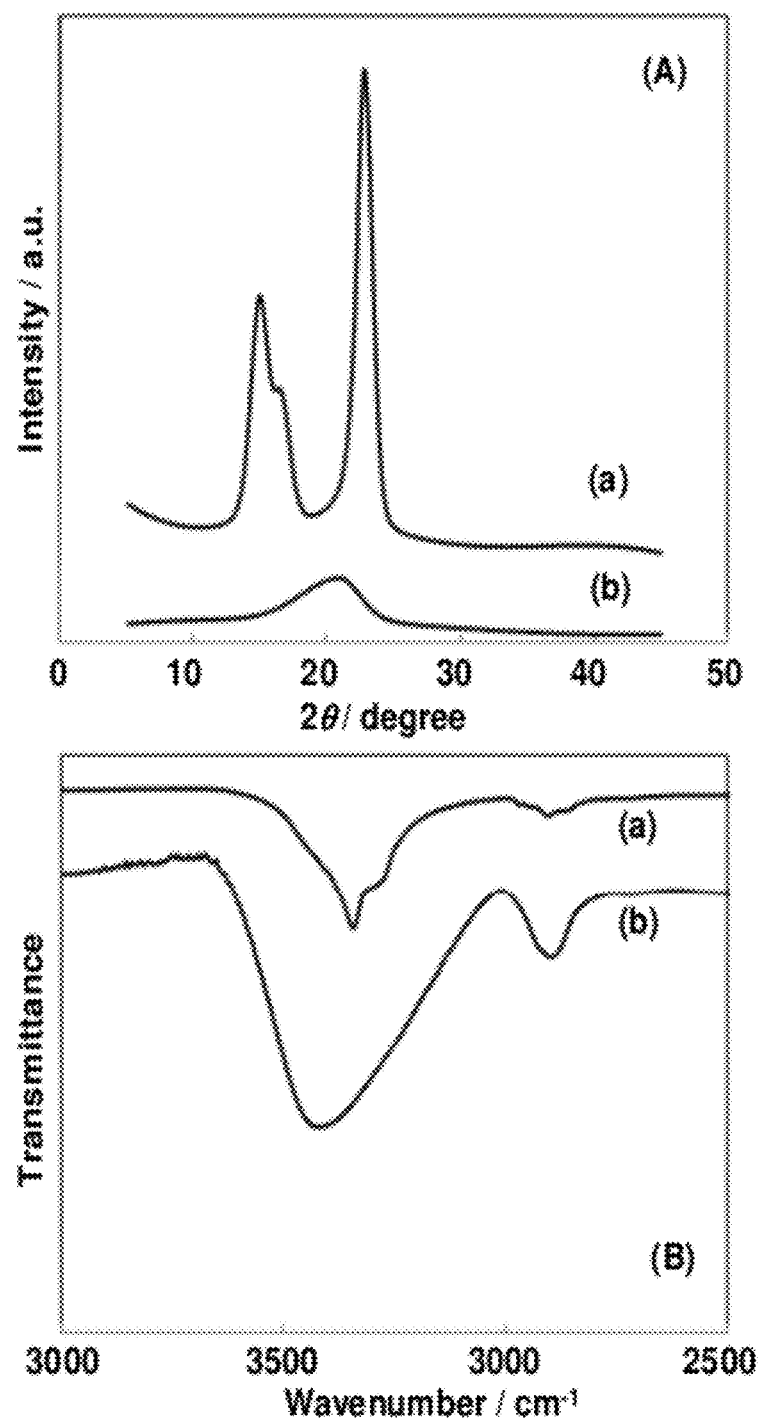

FIG. 11(a) depicts x-ray diffraction (XRD) patterns of cellulose nanocrystals (designated a) and a regenerated cellulose LBL film (designated b). FIG. 11(b)) depicts FT-IR spectra for O—H vibration part of cellulose nanocrystals (designated a) and a regenerated cellulose LBL film (designated b).

Figure 12:
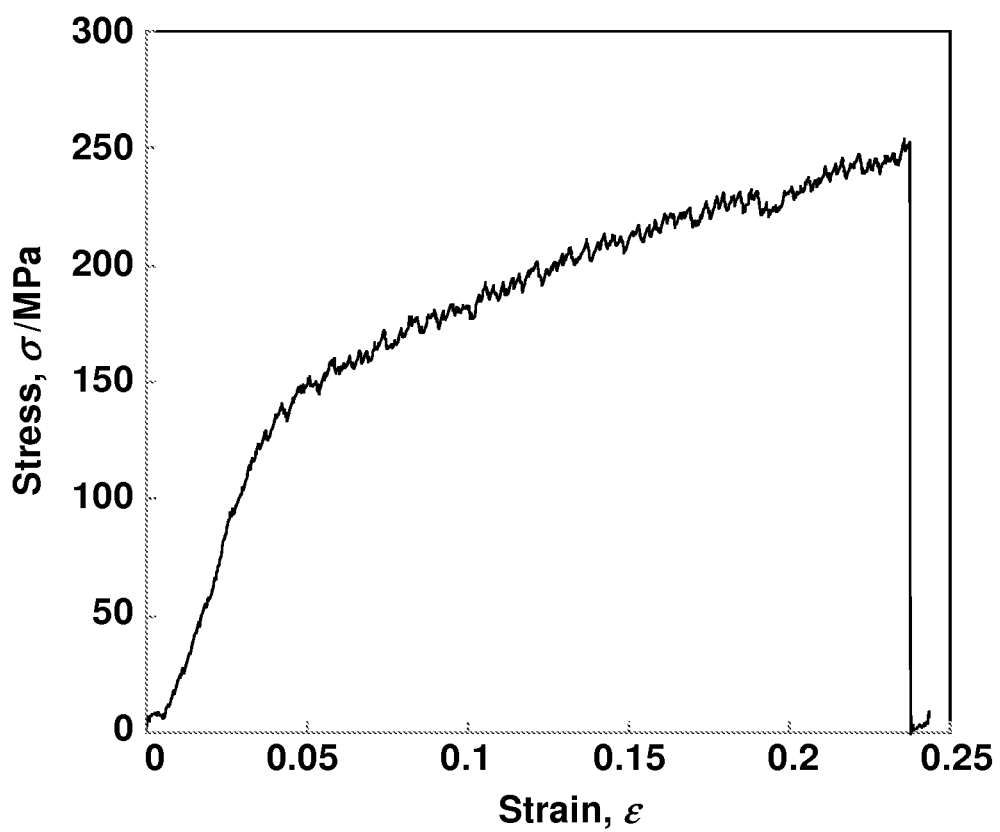

FIG. 12 depicts a graph representing stress versus strain of a freestanding regenerated cellulose film made in accordance with the present technology.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. A non-limiting discussion of terms and phrases intended to aid understanding of the present technology is provided at the end of this Detailed Description.

The present technology relates to use of an ionic liquid as a solvent for layer-by-layer (LBL) assembly of one or more layering materials. In particular, a method for layer-by-layer assembly of a material comprises applying a first ionic liquid comprising a first layering material to a surface to form a first layer and applying a second ionic liquid comprising a second layering material to the first layer to form a second layer. The first ionic liquid and the second ionic liquid can be further applied in an alternating fashion to form a plurality of layers. A third ionic liquid comprising a third layering material can also be applied to the second layer to form a third layer. These various layers can be applied in successive fashion and/or repeatedly applied in alternating fashion to form a plurality of layers to make various thin films, for example.

Aspects of the present methods and compositions include LBL assembly using an ionic liquid as a solvent system for one or more layering materials. Ionic liquids, also referred to as molten salts, can include hydrogen bonding breaking solutions. For example, the ionic liquid can effectively solubilize one or more polyelectrolytes, polymers, and other compounds that have poor solubility and/or stability in aqueous and/or organic solvents. Such polyelectrolytes, polymers, and other compounds are collectively referred to herein as layering materials that are applied in successive fashion using the LBL process. LBL assembly of films and coatings can be performed by applying the ionic liquid comprising a layering material to a variety of substrates, including various solid surfaces, such as metal, ceramic, glass, plastic and polymer materials; fabrics; fibers; nanoparticles, including nanowires, nanorods, liposomes, vesicles, and various sacrificial materials that can later be removed to produce a free film.

Room-temperature ionic liquids can be used as environmentally benign solvents for organic chemical reactions and separations as they can have low vapor pressures and essentially no volatile organic content. Ionic liquids can also be used in molecular self-assembly and supramolecular chemistry. The dielectric property of ionic liquids, which can consist solely of ions, can be moderately controlled depending on the ionic components to change the inter-ionic interaction. As a result, the capability of an ionic liquid to dissolve a polyelectrolyte polymer can also depend on the particular ionic components of the ionic liquid. Some ionic liquids show excellent dissolution ability for polymers that are poorly soluble in conventional solvent systems. Examples of such polymers that can solubilized by ionic liquids include cellulose, silk, and carbon nanotubes. Taking these properties into consideration, the use of ionic liquids as media for LBL assembly provides certain advantages and further expands LBL techniques and applications for LBL films.

Aspects of the present methods and compositions provide for LBL multilayer assembly from ionic liquid solutions. However, one might anticipate that the high viscosity of ionic liquids could adversely affect LBL assembly, in which the self-diffusion process can dominate the electrostatic adsorption process. This drawback can be overcome by employing a spin-assisted LBL technique. Centrifugal force and air shear force generated during the spinning process can permit the layering material, such as a polyelectrolyte polymer, to spread rapidly on a substrate. Notably, electrostatic deposition of a polyelectrolyte can be accomplished using ionic liquid solutions even though one might expect a charge screening effect when using an ionic liquid.

As a particular example, poly(ethyleneimine) (PEI) and poly(sodium-4-styrenesulfonate) (PSS) can be stably dispersed in a hydrophilic ionic liquid and deposited in a layer-by-layer fashion from ionic liquid solutions by means of alternate spin coating steps. Electrostatic interaction is favorable in the ionic liquid even though one may expect a charge screening effect from the ionic medium.

The use of ionic liquid also affords good dispersion of various layering materials, including modified polyelectrolytes. As a particular example, PSS-modified single-walled carbon nanotubes (SWNT-PSS) can be employed in layer-by-layer assembly of single-walled carbon nanotubes with poly (vinylalcohol) (PVA). Despite of the absence of obvious electrostatic interaction between PVA and PSS-SWNT, SWNTs are loaded in the film owing to the weak interaction between PVA and the aromatic moiety. In some embodiments, a certain amount of accumulation of SWNTs on the substrate can provide an electrical conductivity of about $10^2$ S/m with a transparency as high as about 98% for visible light.

LBL assembly employing a layering material dissolved in an ionic liquid can also form synthetic materials with physical and chemical properties approximating many natural materials. For example, many natural, hard materials, such as seashells and animal bones, possess exceptional mechanical properties, which are believed to originate from the well-organized structure of inorganic-organic composites. Other flexible parts, such as plant bodies, muscle, tendon, skin, and hair are almost composed of completely organic composites.

One such example is cellulose, which is the most abundant polymer in nature and forms part of many natural tissues including plant cell walls, tunic cells, and some bacteria. Cellulose is a linear polymer composed of 1,4-linked β-D-glucopyranose rings, bundling laterally by intermolecular hydrogen bonds to form thin microfibrils which contain nanocrystals of the cellulose I structure. Because of the highly ordered structure, the Young's modulus (E) and the tensile strength (σ) of natural fibers composed of cellulose can measured up to about 130 GPa and about 1 GPa, respectively. Such materials are commonly used as a reinforcing fiber for composite materials. However, the high degree of crystallinity of cellulose can complicate processing and chemical modifications in solution or in a melt.

Various approaches have been developed to process natural cellulose in aqueous and non-aqueous solvents. For example, acid treatment with sulfuric acid partly hydrolyzes natural cellulose to give a suspension of cellulose nanocrystals (CellNCs) with a wide variety of aspect ratios. Since CellNCs basically have the same crystalline structure and mechanical properties with natural cellulose I, CellNCs can be used as mechanical reinforcing agents for low-thickness polymer electrolytes for lithium batteries. Negatively charged CellNCs can also be applied to layer-by-layer (LBL) assembly, giving CellNCs composite films with fascinating optical properties.

Cellulose can also be dissolved using a variety of ionic liquids with strong hydrogen bond basicity. High concentrations of hydrogen bond-accepting anions can be effective in breaking the extensive hydrogen bonding network present in natural cellulose. Cellulose as a layering material in an ionic liquid solution can then be precipitated and coagulated by the addition of water, ethanol, and/or other solvents, for example. While the resulting regenerated cellulose has about the same degree of polymerization and polydispersity as the initial cellulose, the morphology of the regenerated cellulose is significantly different. By altering the regeneration processes, the regenerated cellulose can be in a range of structural forms, such as powder, tube, bead, fiber, and film.

Regenerated celluloses from ionic liquid solutions can be used as bioactive membranes, blood-compatible membranes, and composite fibers with wool keratin or multiwalled-carbon-nanotubes (MWCNT). For example, regenerated cellulose fibers coagulated in water can provide a σ of 204±6 MPa, which can be further reinforced up to 335±14 MPa by loading 4 wt % of MWCNT. Mechanical properties can include 138 MPa of σ for regenerated cellulose film prepared by simple casting followed by coagulation in water.

Taking into account the properties of ionic liquids (being non-aqueous and having a good dispersion capacity for polyelectrolytes and even for poorly-soluble polymers such as cellulose, silk, and carbon nanotubes) the use of ionic liquids as media for LBL assembly is advantageous to the further expansion of LBL technique as well as its applications. For example, regenerated cellulose film can be prepared by a spin-assisted LBL technique. While the cellulose-ionic liquid solution exhibits extremely high viscosity, centrifugal force and air shear force generated during the spinning process help the polymers spread on the substrate to form a uniform film. Successive spin-casting of cellulose-ionic liquid solution and coagulation/rinsing in ethanol on a solid substrate give a thin film of regenerated cellulose. The cellulose film can be detached from the substrate and the obtained free-standing film characterized in terms of optical transparency, surface morphology, molecular structure and mechanical strength.

The present methods and compositions allow LBL preparation of regenerated cellulose thin films having high transparency and excellent mechanical properties using a cellulose-ionic liquid solution. For example, a regenerated cellulose thin film can be fabricated by a repetitive spin-deposition/drying process in a LBL fashion using an ionic liquid solution formed from filter paper. Spin-coating of the cellulose ionic liquid solution followed by coagulation of cellulose in ethanol, for example, can provide a thin film with a smooth surface. Repetitive deposition/coagulation allows the film to grow in a regular manner and a free-standing film can be obtained by dissolving a sacrificial layer on which the cellulose film is deposited. In some embodiments, a free-standing film produced thereby can provide an optical transparency as high as about 96% in the visible range and excellent mechanical properties, such as about 248 MPa of tensile strength (σ) and about 4.9 GPa of Young's modulus (E), which is closer to the natural material (e.g., natural cellulose σ of about 1 GPa, E of about 130 GPa) as compared to regenerated cellulose prepared by simple casting followed by coagulation in water (e.g., σ of about 138 MPa).

The present technology employs one or more various ionic liquids as the solvent for various layering materials. Ionic liquids are also known as organic salts and/or molten salts that can have melting points at or below room temperature. For the purposes of the present technology, the terms "ionic liquid" and "organic salt" and "molten salt" have the same meaning. A non-exhaustive list of these materials is provided by Hagiwara et al. in "Room Temperature Ionic Liquids of Alkylimidazolium Cations and Fluoroanions", J. Fluorine Chem. vol. 105, (2000), pp. 221-227, incorporated herein by reference. The present technology relates to methods and compositions including films, coatings, and structures having such films and coatings comprising layering materials that are dispersed, dissolved, or otherwise solubilized in ionic liquids acting as a solvent, carrier, or vehicle emulsion, or a suspension with one or more ionic liquids.

Careful choice of the ionic liquid can provide several benefits, including a wider range for electrochemical stability (e.g., greater than 4 volts (V) and in some cases greater than 6 V); high hydrophobicity; a high decomposition temperature (embodiments of ionic liquids used in the methods and compositions of the present technology do not boil but they decompose at temperatures higher than 150° C. and more preferably higher than 200° C.); a negligible vapor pressure (see, for example, Gordon in "New Developments in Catalysis Using Ionic Liquids, Applied Catalysis: General A, vol. 222, (2001) pp. 101-117; and Earle in "Diels-Alder Reactions in Ionic Liquids," Green Chemistry, vol. 1 (1999) pp. 23-25); non-flammability (non-ignitable by a flame, see PCT Publication No. WO 01/93363 to McEwen et al. entitled "Non-Flammable Electrolytes,"); fire-retardant properties; low UV susceptibility (e.g., for non-conjugated cations, no absorption peaks between 290 and 400 nm); and high electrical and/or thermal conductivity.

Ionic liquids can also include hydrogen bond breaking solutions. Useful ionic liquids include salts of organic cations in combination with either organic or inorganic anions. In some embodiments, the ionic liquid anions of the present technology can contain fluorine, and can include one or more of trifluoromethylsulfonate ("triflate," $CF_3SO_3^-$), bis(trifluoromethylsulfonyl)imide ($N(CF_3SO_2)_2^-$), bis(perfluoroethylsulfonyl)imide (($(C_2F_5SO_2)_2N^-$)), tris(trifluoromethylsulfonyl)methide (($(CF_3SO_2)_3C^-$)), tetrafluoroborate ($BF_4^-$), hexafluorophosphate ($PF_6^-$), hexafluoroantimonate ($SbF_6^-$), and hexafluoroarsenate ($AsF_6^-$). Of these anions, trifluoromethylsulfonate ("triflate," $CF_3SO_3^-$), bis(trifluoromethylsulfonyl)imide ($N(CF_3SO_2)_2^-$), bis(perfluoroethylsulfonyl)imide (($(C_2F_5SO_2)_2N^-$)), tris(trifluoromethylsulfonyl)methide $((CF_3SO_2)_3C^-))$ are preferred. In some embodiments, the anion can include bis(trifluoromethylsulfonyl)imide anion $(N(CF_3SO_2)_2^-)$ because of its low cost and high hydrophobicity. The bis(trifluoromethylsulfonyl)imide anion is also known as bis(trifluoromethanesulfonyl)amide or bis(trifluoromethanesulfonyl)imide.

Examples of useful organic cations of ionic liquids used to dissolve, disperse and/or solubilize the various layering materials can illustratively include one or more of: imidazolium; pyridinium; pyridazinium; pyrimidinium; pyrazinium; pyrazolium; oxazolium; 1,2,3-triazolium; 1,2,4-triazolium; thiazolium; piperidinium; pyrrolidinium; quinolinium; and isoquinolinium. Ionic liquids including a quaternary ammonium based ionic liquid can include ionic liquids having a glass transition temperature ($T_g$) lower than −40° C. Hydrophobic ionic liquids are also useful in the present LBL process. Other examples of hydrophobic liquids include those described in U.S. Pat. No. 5,827,602 to Koch et al. entitled "Hydrophobic Ionic Liquids," which issued Oct. 27, 1998 and is incorporated herein by reference.

With respect to ionic liquids in general, the following documents provide further examples of ionic liquids useful for the present technology: U.S. patent application Ser. No. 11/406,620, Publication No. US 2006/0241287 of Hecht et al., entitled "Extracting Biopolymers from a Biomass Using Ionic Liquids"; U.S. patent application Ser. No. 11/472,724, Publication No. US 2006/0240727 of Price et al., entitled "Ionic Liquid Based Products and Method of Using The Same"; U.S. patent application Ser. No. 11/472,729; Publication No. US 2006/0240728 of Price et al., entitled "Ionic Liquid Based Products and Method of Using the Same"; U.S. patent application Ser. No. 11/263,391, Publication No. US 2006/0090271 of Price et al., entitled "Processes For Modifying Textiles Using Ionic Liquids"; and U.S. patent application Ser. No. 11/375,963, Publication No. US 2006/0207722 of Amano et al. entitled "Pressure-Sensitive Adhesive Compositions, Pressure-Sensitive Adhesive Sheets and Surface Protecting Films," the disclosures of which are incorporated herein by reference.

Other suitable commercially available ionic liquids include: Basionic® ionic liquid products available from BASF (Florham Park, N.J.) and include: 1-Ethyl-3-methylimidazolium chloride, 1-Ethyl-3-methylimidazolium methanesulfonate, 1-Butyl-3-methylimidazolium chloride, 1-Butyl-3-methylimidazolium methanesulfonate, Methyl-tri-n-butylammonium methylsulfate, 1,2,4-Trimethylpyrazolium methylsulfate, 1-Ethyl-2,3-di-methylimidazolium ethylsulfate, 1,2,3-Trimethyl-imidazolium methylsulfate, Methylimidazolium chloride, Methylimidazolium hydrogensulfate, 1-Ethyl-3-methylimidazolium hydrogensulfate, 1-Ethyl-3-methylimidazolium tetrachloroaluminate, 1-Butyl-3-methylimidazolium hydrogensulfate, 1-Butyl-3-methylimidazolium tetrachloroaluminate, 1-Ethyl-3-methylimidazolium acetate, 1-Butyl-3-methylimidazolium acetate, 1-Ethyl-3-methylimidazolium ethylsulfate, 1-Butyl-3-methylimidazolium methylsulfate, 1-Ethyl-3-methylimidazolium thiocyanate, 1-Butyl-3-methylimidazolium thiocyanate, Choline acetate, Choline salicylate, Tris-(2-hydroxyethyl)-methylammonium methylsulfate.

In some embodiments, the ionic liquids include tetraalkylammonium cations, as ionic liquids made from these cations have minimal optical absorbance in the ultraviolet portion of the spectrum, which gives ionic liquids based on these cations enhanced photochemical stability. Quaternary ammonium cations useful in the present technology may be substituted with H, F, phenyl, alkyl groups with 1 to 15 carbon atoms, and other chemical substituents. Cations may further have bridged ring structures.

Layering Materials

Layering materials used in the present methods and compositions can include polyelectrolytes, polymers, and other materials that are soluble in the ionic liquid. Such polyelectrolytes, polymers, and other materials, for example, may be insoluble or poorly soluble in aqueous and/or organic solvents. In some embodiments, polymers as used herein can include a compound having a linear and/or branched backbone of chemical units which are secured together by one or more various linkages. In some but not all cases the backbone of the polymer may be branched. The term "backbone" is given its usual meaning in the field of polymer chemistry. The polymers can be heterogeneous in backbone composition thereby containing any possible combination of polymer units linked together such as peptide-nucleic acids. In some embodiments, a polymer is homogeneous in backbone composition. The layering material may include one or more of the following: a biopolymer, including a nucleic acid, a polypeptide, a polysaccharide, and a carbohydrate; a polyurethane; a polycarbonate; a polyurea; a polyethyleneimine; a polyarylene sulfide; a polysiloxane; a polyimide; a polyacetate; a polyamide; a polyester; a polythioester; and combinations thereof. In some embodiments, the layering material can be a high molecular weight material, where a "high molecular weight" material refers to a molecular weight greater than about 1,000 atomic units.

In some embodiments, the layering material includes one or more polyelectrolytes. Polyelectrolytes that form the individual layers on the substrate can include polyelectrolytes having either monomeric substances having two ionic or ionizable functional groups of the same charge (so-called bola amphiphiles) or polymers that have a multiplicity of ionic or ionizable functional groups of the same charge (so-called polyelectrolytes or polyionenes). These polyelectrolytes preferably carry functional groups of the same charge (i.e., either cations or groups which can be ionized to cations, or anions or groups which can be ionized to anions). The polyelectrolytes can comprise different cationic species (or species that can form cations) or different anionic species (or species that can form anions). However, for reasons of accessibility and ease of production, in certain aspects, the two functional groups in the monomeric substances are the same and the multiple functional groups in the polymers are also the same.

As used herein, with respect to linked units of a polymer, "linked" or "linkage" means two entities are bound to one another by any physicochemical means. Any linkage known to those of ordinary skill in the art, covalent or non-covalent, is embraced. Such linkages are well known to those of ordinary skill in the art. Natural linkages, which are those ordinarily found in nature connecting the chemical units of a particular polymer, are most common. Natural linkages include, for instance, amide, ester and thioester linkages. The chemical units of a polymer may be linked, however, by synthetic or modified linkages. Polymers where the units are linked by covalent bonds will be most common, but also included are hydrogen bonded, etc.

Examples of a layering material include one or more organic polymers made up of a plurality of chemical units. A "chemical unit" as used herein is a building block or monomer which can be linked directly or indirectly to other building blocks or monomers to form a polymer. The polymer preferably is a polymer of at least two different linked units. The particular type of unit will depend on the type of polymer.

For instance, DNA is a biopolymer comprised of a deoxyribose phosphate backbone composed of units of purines and pyrimidines such as adenine, cytosine, guanine, thymine, 5-methylcytosine, 2-aminopurine, 2-amino-6-chloropurine, 2,6-diaminopurine, hypoxanthine, and other naturally and non-naturally occurring nucleobases, including substituted and unsubstituted aromatic moieties. RNA is a biopolymer comprised of a ribose phosphate backbone composed of units of purines and pyrimidines such as those described for DNA but wherein uracil is substituted for thymidine. DNA units may be linked to the other units of the polymer by their 5' or 3' hydroxyl group thereby forming an ester linkage. RNA units may be linked to the other units of the polymer by their 5', 3' or 2' hydroxyl group thereby forming an ester linkage. Alternatively, DNA or RNA units having a terminal 5', 3' or 2' amino group may be linked to the other units of the polymer by the amino group thereby forming an amide linkage.

The chemical units of a polypeptide are amino acids, including the 20 naturally occurring amino acids as well as modified amino acids. Amino acids may exist as amides or free acids and are linked to the other units in the backbone of the polymers through their α-amino group thereby forming an amide linkage in the polymer.

In some embodiments, a polyelectrolyte layering material for the individual layers of the LBL assembly can include poly(4-styrene sulfonate) (PSS), polyethyleneimine, polyallylamine, polyvinyl alcohol (PVA), poly(acrylic) acid, polymers with condensed aromatic ring structures, amphiphilic co-polymers, DNA, proteins, polysaccharides, surfactants, and mixtures thereof.

The layering material can include a polysaccharide where a polysaccharide is a polymer composed of monosaccharides linked to one another. In many polysaccharides, the basic building block of the polysaccharide is actually a disaccharide unit which can be repeating or non-repeating. Thus, a unit when used with respect to a polysaccharide refers to a basic building block of a polysaccharide and can include a monomeric building block (monosaccharide) or a dimeric building block (disaccharide). In some embodiments the polysaccharide can include various polymers having repeating chemical units (both D-forms and/or L-forms) of pentoses and hexoses, including ketopentoses, aldopentoses, ketohexoses, aldohexoses, heptoses, and deoxy sugars. Common polymers of monosaccharides including glucose, fructose, galactose xylose, ribose, arabinose and lyxoses and combinations thereof are contemplated polymers for use as layering materials in the present technology. In some embodiments, the glucose polymers that can be used as layering materials can include glucose polymers having β(1→4)-glycosidic bonds, such as those found in cellulose.

Cellulose and modified celluloses are also contemplated as layering materials of the present technology. Cellulose layering materials can also include cellulose nanocrystals (CellNs). These nanomaterials provide natural materials that have renewable origins, and further can have impressive mechanical properties, such as a bending strength of about 10 GPa and E about 150 GPa. CellNs are inherently a low cost material and can be cultivated as nanocrystals from a variety of natural sources, including cotton, tunicate, algae, bacteria, and wood. In some embodiments, cellulose nanocrystals can be prepared by the treatment of natural sources such as shrouds of tunicate, specific marine animals. These shrouds provide high quality cellulose nanocrystals with long fibers with diameters in the nanometer range. Depending on the source, CellNs are also available in a wide variety of aspect ratios; e.g., about 200 nm long and 5 nm in lateral dimension and up to several microns long and 15 nm in lateral dimension (from cotton and tunicate, respectively). As compared to other inorganic reinforcing fillers, CellNs have additional advantages, including positive ecological impact, low energy consumption, ease of recycling by combustion, high sound attenuation, and comparatively easy processability due to their nonabrasive nature, which allows high filling levels, in turn resulting in significant cost savings. CellNs are an attractive nanomaterial for the preparation of low cost, lightweight, and high-strength hybrid composites for multitude of applications.

Layering materials can also include thermally and/or electrically conductive materials, for example, carbon fiber, graphite, nano-graphite platelets, carbon nanotubes, carbon black, boron nitride, silicon nitride, aluminum nitride, aluminum oxide, magnesium oxide and combinations thereof, thermoplastic materials including as illustrative examples: polycarbonate; acrylonitrile butadiene styrene (ABS) (chemical formula $(C_8H_8.C_4H_6.C_3H_3N)_n$); polycarbonate/acrylonitrile butadiene styrene alloys (PC-ABS); polyphenylene sulfide) (PPS); polyphenylene ether; modified polyphenylene ether containing polystyrene; liquid crystal polymers; polystyrene; styrene-acrylonitrile copolymer; rubber-reinforced polystyrene; acrylic resins such as polymers and copolymers of alkyl esters of acrylic and methacrylic acid styrene-methyl methacrylate copolymer; styrene-methyl methacrylate-butadiene copolymer; polymethyl methacrylate; methyl methacrylate-styrene copolymer; polyvinyl acetate; polysulfone; polyether sulfone; polyether imide; polyarylate; polyamideimide; polyvinyl chloride; vinyl chloride-ethylene copolymer; vinyl chloride-vinyl acetate copolymer; polyimides, polyamides; polyolefins such as polyethylene; ultra high molecular weight polyethylene; high density polyethylene; linear low density polyethylene; polyethylene napthalate; polyethylene terephthalate; polypropylene; chlorinated polyethylene; ethylene acrylic acid copolymers; polyamides such as nylon 6, nylon 6,6, and the like; phenylene oxide resins; phenylene sulfide resins; polyoxymethylenes; polyesters; polyvinyl chloride; vinylidene chloride/vinyl chloride resins; and vinyl aromatic resins such as polystyrene; poly(vinylnaphthalene); poly(vinyltoluene); polyamides; polyimides; polyaryletheretherketone; polyphthalamide; polyetheretherketones; polyaryletherketone; and combinations thereof.

Layering materials can also include thermosetting resins as known in the art, including aromatic polyamides such as poly paraphenylene terephthalamide polymers, polyamide, bismaleimide, polyurethane nanoparticles; Montmorillonite clay (MTM), which is composed of ~1 nm thick by 100-1000 nm diameter sheets, and single or multi walled carbon nanotubes (SWNT & MWNT) electrically conductive polymers, including conjugated polymers such as poly(3,4-ethylenedioxythiophene, (PEDOT), polypyrrole, polyaniline and the like, vermiculite, kaolin, silica oxide, alumina oxide, molybdenum oxide, carbon nanoparticles, carbon fibers, graphene sheets, amorphous graphite, nanowhiskers, cellulose fibers, lignin, metal oxide nanoparticles/nanowires/nanotubes, semiconductor nanoparticles/nanowires/nanotubes, magnetic nanoparticles/nanowires/nanotubes, carbon nanotubes, including single-wall (SWNT) and multi-wall (MWNT) and liquid crystal polymers.

In some embodiments, the layering material can also include inorganic thermoelectric materials such as alloys of bismuth, lead, antimony, selenium, tellurium, and silver. For example, the layering material comprising a bismuth telluride material with or without dopants to effectively make p-type and n-type charge carriers, which can be dispersed in an ionic liquid and coated over one or more electrical contacts, connectors to form thermoelectric unicouples and the like for power generation using the Seebeck effect or for cooling utilizing the Peltier effect. For example, while one layer type of a LBL coated device can comprise an electrical conductor, the second or alternating layer can comprise materials that are similarly thermoelectric, or they may be electrical insulators such as matrices comprising a ceramic material.

In various embodiments, a substrate material can be used to support the incremental deposition of layers of desired layering materials. The support substrate can be transparent, impermeable, or reflecting, as well as electrically conducting, semi-conducting, or insulating. The chemical nature of the substrate can be inorganic or organic. Examples of inorganic support materials are described in U.S. Pat. No. 5,208,111, incorporated herein by reference, and include metals, semi-conductor materials, glasses or ceramic materials, such as gold, platinum, nickel, palladium, aluminum, chromium, steel and other metals, germanium, gallium arsenide, silicon and other semi-conductor materials, glasses of a wide range of chemical composition, quartz glass, porcelain, and mixed oxides, which are understood to mean ceramic materials. Further inorganic substances which are suitable as substrate supports are, for example, graphite, zinc selenide, mica, silica, aluminum dioxide, silicon dioxide, aluminum nitride, cobalt nitride, lithium niobate and further substrate materials, if desired in the form of inorganic single crystals, such as are known to those of skill in the art.

In some embodiments, organic materials for the substrate can be polymeric materials that are chosen based on dimensional stability and/or resistance to solvents. Suitable examples include: polyesters, such as polyethylene terephthalate, polybutylene terephthalate and others; polyvinyl chloride; polyvinylidene fluoride; polytetrafluoroethylene; polycarbonate; polyamide; aromatic polyamide; polyimide; poly(meth)acrylate; polystyrene; polyethylene; ethylene/vinyl acetate copolymer; and other substrate materials suitable for LBL, as generally known to one of skill in the art.

The substrate materials can have charged or ionizable surfaces, or alternatively, their surfaces can be modified such that substantial regions or at least a partial region of the surface of the substrate is covered with ions or ionizable compounds having the same charge. A first layering material can therefore be adsorbed to the substrate over the charged surface. However, the application of ions or ionizable compounds over the entire area of the substrate can also be effected by a chemical reaction on the support substrate surface itself, in which the surface is densely covered with ions or ionizable groups having the same charge to form a layer. Such modifications are known to one skilled in the art and working in the area of multi-layered thin films. Examples of these include self-assembly monolayers, for example, comprising an $\alpha,\omega$-dithiol, cysteamine, amino-containing thiols and other thiols containing a further ionic or ionizable group, on metals, such as gold, silver, cadmium and others. In such cases, the thiol group can be solidly bound to a metallic surface and a second thiol group, a carboxyl group, an amino group or another ionic or ionizable group forms the ionic modification of the metallic support to be used. A further example is silanation of the surface with silanes containing alkoxy groups, which additionally contain a further ionic or ionizable group. Silanation is possible with silicon-containing support substrates in a manner known to one skilled in the art. The ionic or ionizable group can be, for example, a sulfur group or an ionizable amino group.

Other examples relate to the chemical modification of polymeric organic supports (polymer-analogous reaction). For example, polyethylene can be provided on the substrate surface with carboxyl groups by means of oxidizing agents, such as chromic acid. Methacrylate or methacrylamides can also be provided on the substrate surface with carboxyl groups by means of hydrolysis. Sulphonation of polystyrene resins on the surface also leads to a modification utilizable according to the present disclosure, such materials are also known as flat ion exchangers. Furthermore, it is known to one skilled in the art that instead of anionic groups (e.g., carboxyl groups, sulfo groups, etc.), cationic groups (e.g., amino groups) can also be obtained by chloromethylation followed by the introduction of an amino group. Reactions of this type are known as polymer-analogous reactions.

Additionally, freshly split mica can be used as a substrate, which has a negatively charged surface on which cationic compounds can be adsorbed directly. Moreover, for glass or quartz substrates, it is also possible to adsorb cationic compounds, such as polyethyleneimine, for example, after a short dipping period in sodium hydroxide solution. In some aspects, the substrate can have at least one surface portion that has a relatively even and high charge density of ions and/or ionizable groups. It is also preferable that the ions and/or ionizable groups on the surface of the substrate have the same charge.

Methods and compositions for applying layering materials using an LBL process can include the following aspects. LBL methods can generally include the steps of: 1) providing a surface, such as the surface of a substrate; 2) optionally modifying at least a portion or region of the surface to impart a charge; 3) applying a first ionic liquid comprising a first layering material, which can be dispersed, solubilized or intimately mixed in the first ionic liquid, to the substrate to form a first layer; 4) optionally rinsing the first layer with a first wash solution; 5) applying a second ionic liquid comprising a second layering material, which can be dispersed, solubilized or intimately mixed with in the second ionic liquid, to the first layer to form a second layer; 6) optionally rinsing the second layer with a second wash solution; 7) repeating steps #3 through #6 to yield a multilayer coated substrate. The solutions in step 7) can be the same as or different from the solutions used in steps 3) to 6). It should be appreciated that applying the first and second ionic liquids can include any joining, coupling, bonding, attaching, or other mechanism, such as electrostatic attraction, adsorption, absorption, ionic bonding, and the like as recognized by one of skill in the art as promoting a connection or interaction of layering material with a selected target, substrate, or previously applied layering material. The resulting multilayer coatings can comprise one or more different layering materials and the plurality of layers can comprise layers of these layering materials dissolved or solubilized in the same or different ionic liquids.

Methods for performing LBL methods are described in U.S. Pat. No. 7,045,087, Ser. No. 09/818,001, and U.S. Pat. No. 7,438,953, Ser. No. 10/457,024, the disclosures of which are incorporated herein by reference. These methods are modified in the present technology by employing one or more ionic liquids each comprising one or more layering materials.

In some embodiments of the present technology, the layering materials can be dispersed, dissolved, and/or otherwise solubilized in an ionic liquid. As provided above, in some illustrative examples, the first layering material has a chemical affinity for the substrate. The second layering material in turn has a chemical affinity for the first layering material. The first layering material can then in turn be applied to the second layering material and so on. Or, if the second layering material is the same as the first layering material, then multiple layers of the first material can have a chemical affinity with each other and can form chemical bonds, such as ionic bonds, van der Waal bonds, and other non-covalent bonds, or the plurality of layers of the same layering material can be chemically joined by polymerization of surface groups of the first layer with surface groups of the second layer, by physical polymerization of the alternating layers or by combinations of these polymerization methods. Other methods, such as chemically modifying the previously layered material prior to applying the next alternating layer, can also be employed to have the same material form multiple layered films and coatings. Single layers of the same or different materials can also be bonded together by drying the applied layers sequentially, wherein the layer previously deposited after drying has at least some dissolved material which can bond to the next applied layer through one or more of dipole interactions, van der Waals interaction, and hydrogen bonding, etc.

In addition to various non-covalent bonding mechanisms that can be exploited to adhere various layers of materials to one another, other approaches can include cross-linking the various layers to one another sequentially and/or intermittently. Such examples of cross-linking can include the use of actinic radiation, chemical cross-linking, and other forms of surface cross-linkage formation. Moreover, following application of an ionic liquid comprising a layering material to form a layer, the layer can be stabilized by drying, crosslinking, or irradiating the layer.

In some embodiments, the layering materials can be deposited on a substrate or layer by dipping the substrate and or film into the next layering material. In other embodiments, methods for more active application of the one or more layering materials can include spraying, sputtering, spin coating, vapor deposition, electrochemical deposition and combinations thereof. In some embodiments, the centrifugal force and air shear force generated during the spin coating process allows polymers to spread rapidly on the substrate and form uniform film layers.

In some embodiments, the freshly applied layer over the substrate or previously deposited layer can be washed or treated to remove excess layering material or to provide the necessary surface qualities of the applied layer for subsequent attachment with the next layering material. Rinsing and wash steps can be performed using common methods known in the art, for example, by spraying a wash solution, dipping the substrate and/or film or coating in a wash solution, and the like. Rinsing and washing can be performed for each applied layer or only following certain layers. The wash solution can be used to remove a portion or substantially all of the ionic liquid while leaving the layering material overlying and adhered to the substrate or to a previously applied layer.

The LBL process is an iterative one, and multiple layers ranging from about 2 to about 5,000 or more layers can be applied thereby increasing the thickness of the film to a desired thickness. Several physical parameters may assist in the determination of the desired thickness of the films and/or coatings applied to various substrates, for example, the desired mechanical strength of the film, coating or device application, the degree of optical transmittance desired, the thickness of each individual layer, the viscosity of the layering material, and the method of applying the layering material to the substrate or film.

In some embodiments, the ionic liquids used to solubilize the layering material can have inherently high viscosities. Coating or applying an ionic liquid having a high viscosity can be facilitated by dispersing the ionic liquid containing the layering material using spin-casting techniques or by adding a polar organic solvent to the ionic liquid to reduce the overall viscosity of the medium containing the layering material.

In some embodiments, the layering material may be poorly soluble in the ionic liquid may be coagulated or precipitated using a solvent, such as water, ethanol, and/or acetonitrile. The solvent can be used to coagulate or precipitate the layering material during or following application. Another layer can then be applied. In some embodiments, the layering material, for example, cellulose in an ionic liquid, may be washed in a coagulation solution to coagulate the layering material and permit the washing and removal of ionic liquid from the surface leaving behind the coagulated or precipitated layering material. In some embodiments, the layered material can be dried prior to application of the next layer.

There are numerous applications of LBL films made using layering materials carried by ionic liquids. Multifunctional and multicomponent films can be made where the LBL method allows molecular-scale control of the stratified structure. The LBL films of the present technology have a multitude of uses, some of which are co extant with LBL films made using other procedures. However, several features of LBL films made using ionic liquids may not be achieved using conventional aqueous systems as ionic liquids possess unique properties and can solubilize certain polyelectrolytes, polymer, and other materials in ways and/or quantities that cannot be achieved using aqueous-based systems. The use of ionic liquids in LBL processes greatly expands the applications of LBL films, coatings, and laminates, for example, as applied to electronic devices for example, where anhydrous conditions can be highly desirable.

Applications for materials made using the present methods and compositions include various electronic coatings. For example, LBL layers from ionic liquids can be useful for manufacturing barrier layers for protection of electronic circuits and device encapsulation. Oxygen and moisture barriers are other application examples. Electronic devices can also be produced from carbon nanotubes and a variety of semiconductors, metals, and polymers. LBL methods using layering material in ionic liquids can also be used in manufacture of solar cells and flexible electronics. Several features such as optical transparency, biocompatibility, surface morphology, molecular structure, and mechanical strength can be incorporated into LBL layered materials for use in electronic devices, packaging for electronic devices, insulation materials, conductive (electrical) coatings, heat retardation, thin transistor applications, electronic shielding applications, solar power polymer substrates for solar energy harnessing, liquid crystal displays, and flexible electronic substrates, to name some examples.

Additional applications of LBL films formed using ionic liquid(s) containing layering material(s) include the following: coatings, films, fabrics and laminates for electroconductive applications, thermally conductive applications, information storage systems, chemical and biological sensors, fiber-optical systems, magneto-optical and optical devices, pervaporation membranes, protective coatings and light emitting diodes, electromagnetic shielding applications, fabrics with enhanced force and temperature resistance, for example, fabrics containing carbon nanotubes, cellulose derivatives and aromatic polyamide polymers, e.g. poly paraphenylene terephthalamide polymers, among others.

Example embodiments are provided so that this disclosure will be thorough and will fully convey the scope of the technology to those who are skilled in the art. Numerous specific details are set forth such as examples of specific components, devices, and methods, to provide a thorough understanding of various embodiments of the present disclosure. It will be apparent to those skilled in the art that specific details need not be employed, that example embodiments may take on many different forms, and that neither should be construed to limit the scope of the disclosure. In some example embodiments, well-known processes, well-known device structures, and well-known technologies are not described in detail.

EXAMPLES

Example 1

Preparation of LBL Films Containing Carbon Nanotubes

Materials. 1-Ethyl-3-methylimidazolium ethylsulfate ([EMIm][EtSO$_4$]), poly(sodium-4-styrenesulfonate) (PSS) (molecular weight, 1,000,000 Da.). Poly(ethyleneimine) (PEI) (branched, molecular weight, 25,000 Da.) and poly vinyl alcohol (PVA) (80% hydrolyzed, molecular weight, 9,000 to 10,000 Da.) can be purchased from Sigma-Aldrich, (St. Louis Mo., USA) and used as received without further purification. The purified P2-Single Walled Carbon Nanotubes (P2-SWNT) (70-90% carbonaceous purity) was obtained from Carbon Solutions, Inc. (Riverside, Calif., USA) PSS, PEI and PVA can be individually dissolved in deionized water (DI water) with the concentration of 50 mg/mL. The pH of PEI solution was adjusted to 3.7 by hydrochloric acid. Single wall carbon nanotubes (SWNTs) are dispersed in PSS solution (1 mg/mL) with 1 day of mild sonication. The concentration of SWNT was adjusted to 0.5 mg/mL. Ionic liquid solutions can be prepared by the co-solvent evaporation method since direct dispersion of polymers into ionic liquids is generally hampered by the high viscosity of ionic liquids. Briefly, 5 ml of [EMIm][EtSO$_4$] was individually mixed with 0.5 mL of aqueous solutions (50 mg/mL) of PSS, PEI and PVA. The aqueous dispersion of SWNT-PSS was also added to [EMIm][EtSO$_4$] by equivolume. These all mixtures gave single phase without precipitation or phase separation. The resultant solutions are applied to lyophilization for 24 hours and further dried in vacuo at 80° C. for 24 hours to remove water thoroughly. The water content of ionic liquid solutions estimated from the mass change was below 0.01 wt %. The final concentrations of ionic liquid-polymer solutions can be adjusted to 5 mg/mL for PSS, PEI and PVA and 0.5 mg/ml for SWNT (with 1 mg/mL of PSS).

LBL assembly. Silicon wafers and glass slides used as substrates for multilayer assembly can be treated with piranha solution (concentrated H$_2$SO$_4$+30% H$_2$O$_2$ in approximately 3:1 to 4:1 ratio). LBL films can be obtained using spin coater (Laurell Technologies, North Wales, Pa., USA). Polymer solutions are alternately spun onto substrates, with washing steps between the layer deposition steps. 50 µl of polymer ionic liquid solution was placed on the substrate and then the substrate was rotated with a spinner according to a fixed rotation program (typically 500 rpm for 5 seconds, 2000 rpm for 10 seconds and 6000 rpm for 10 seconds, sequentially). After the deposition of each polyelectrolyte layer, the non-volatile ionic liquid and unadsorbed polymers can be thoroughly removed by rinsing with 0.5 mL of acetonitrile at 3000 rpm for 20 seconds.

Instrumental Analysis. The growth of multilayer films was tracked with ellipsometry and ultraviolet-visible absorption spectroscopy. Ellipsometry measurements can be obtained using a BASE-160 Spectroscopic Ellipsometer produced by J. A. Woollam Co. Inc. (Lincoln Nebr., USA). Ultraviolet-visible absorption measurements can be taken using an Agilent 8453E Ultraviolet-visible spectrophotometer. The surface morphology of obtained films was characterized by atomic force microscopy (AFM), Nanoscope III, (Digital Instruments/Veeco Metrology Group, Santa Barbara Calif., USA) and scanning electron microscopy (SEM, FEI Nova Nanolab, Hillsboro, Oreg., USA). An Agilent 34401A multimeter was used for electrical measurements (Agilent, Santa Clara, Calif., USA).

Results and Discussions. [EMIm][EtSO$_4$] was chosen as an ionic liquid since it has the highest dielectric constant value among ionic liquids investigated however, other ionic liquids having a high dielectric constant could have been used. [EMIm][EtSO$_4$] showed good thermodynamic solubility for both cationic and anionic polymers, PEI and PSS, respectively, even after the thorough removal of co-solvent water. These polymer solutions are stable for more than three months. As a preliminary test, aliquots of ionic liquid solutions of PEI and PSS are mixed. Once each of the polymers was mixed with the ionic liquid, the solution turned to opaque, indicating the formation of aggregates of polyelectrolytes in the ionic liquid. Although the surface charge screening from the ionic media is expected to prevent electrostatic interaction between polyelectrolytes, the cooperative multipoint interaction between polyelectrolytes should work in combination with secondary weak interactions such as solvophobic interaction, leading to the assembly. Considering the formation of polyelectrolyte complexes is fundamentally based on the ion-exchange process, the selective interaction between sulfonate and protonated secondary amine groups in PSS and PEI, respectively, would be favorable even in ionic liquids.

Figure 1:
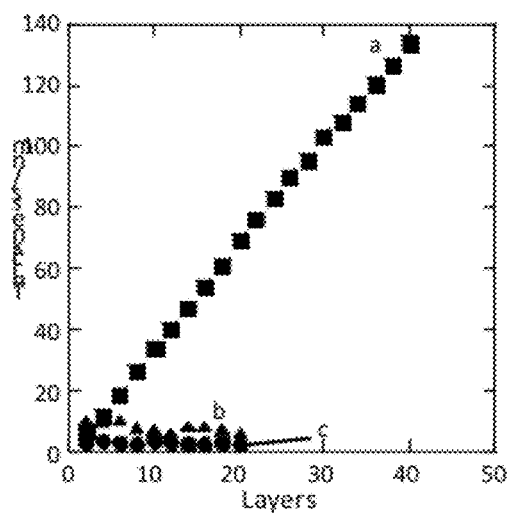
FIG. 1 depicts a graph representing ellipsometry thickness measurements of multilayer films made from (a) polyethyleneimine/polysulfonatestyrene (PEI/PSS), (b) PSS and (c) PEI.

FIG. 1 shows the thickness growth curve of PEI/PSS multilayer films together with control plots of the films made from repetitive deposition of PSS or PEI solely. The film thickness of PEI/PSS multilayers increases linearly with the correlation coefficient of almost unity and the average thickness per layer pair are estimated to be about 7 nm. Since the both films made from PSS or PEI solely never showed growth of film thickness in a layer-by-layer fashion, the electrostatic interaction between PEI and PSS should be responsible for growth of multilayer film. The contact angle measurement on the LBL film gave a suggestive result for the mechanism of film growth. The static contact angle of water droplet on the 10 bilayers PEI/PSS film was measured to be 32±3°, which was clearly larger than that of LBL film prepared from aqueous solutions (12±3°). The surface of LBL films and coatings produced from ionic liquid should have polymers with different structural conformations from those of aqueous LBL films and coatings, leading to the difference in the mode of adsorption of polymers and the contribution of secondary interactions such as solvophobic interaction between ionic liquid-LBL methods and aqueous-LBL methods.

Figure 2:
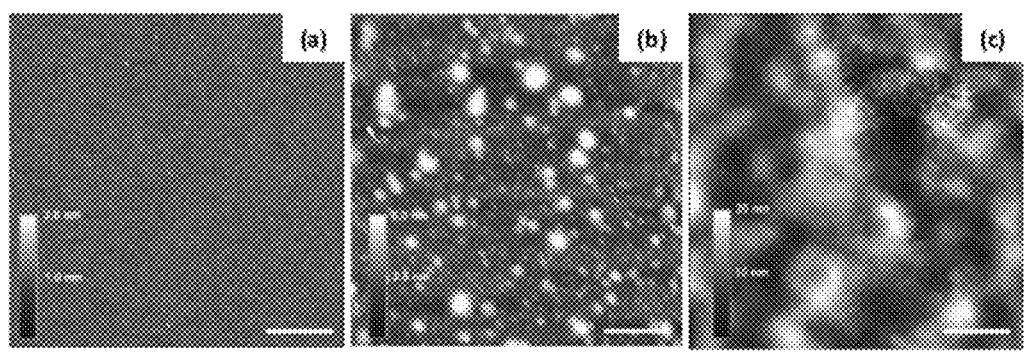
FIG. 2 depicts atomic force micrographs (AFM) in tapping mode of (a) a single PEI, (b) (PEI/PSS)$_1$ bilayer and (c) (PEI/PSS)$_{20}$ films. Scale bar; 1 µm.

Surface morphology and topology of ionic liquid based LBL films can be characterized by AFM measurement. The first PEI layer was spin-coated followed by rinsing with acetonitrile to form ultra uniform surface on a silicon wafer (FIG. 2a). On the deposition of PSS layer, aggregates from tens of nanometers to 500 nm in width and several nanometers in height are observed (FIG. 2b). As the layer number increased, the substrate was uniformly covered by the sequential accumulation of polyelectrolytes. FIG. 2c shows the surface morphology of 20 bilayers of PEI & PSS layering material film. Overall, the substrate was fully covered by the alternating multilayers of PEI/PSS with the surface roughness about 3.7 nm.

Figure 3:
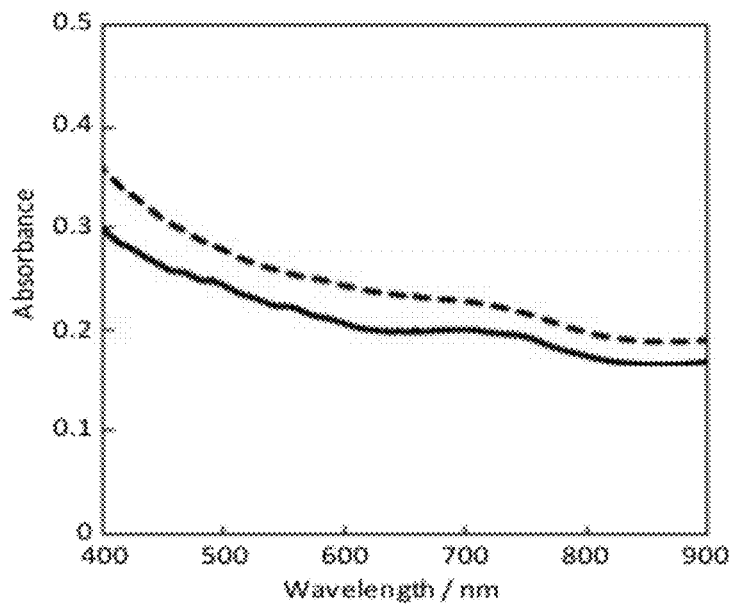
FIG. 3 depicts a graph representing an absorption spectra of SWNT-PSS in water (broken line) and in [EMIm][EtSO$_4$] (ionic liquid) (solid line). The concentration of SWNT is 0.025 mg/ml and the optical path is 5 mm.

Since PSS could be dissolved in [EMIm][EtSO$_4$] by a co-solvent evaporation method, the PSS capped SWNT was also stably dispersed in [EMIm][EtSO$_4$]. As shown in FIG. 3, SWNT in ionic liquid showed well-resolved absorption profile and electronic transition bands of SWNT are more pronounced in ionic liquid than in water. Imidazolium cations in ionic liquids would facilitate the debundling of SWNT by the specific interaction with SWNT as reported previously, giving the good dispersion. PVA was chosen as a counter-polymer polyelectrolyte of SWNT-PSS because this polymer has demonstrated successful LBL assembly with SWNT-PSS on the basis of specific interaction between PVA and aromatic compounds.

FIG. 5a shows continuous decrease of optical transmittance from UV to near-infrared region, demonstrating successful LBL accumulation of SWNT in a similar manner to LBL film synthesis using an aqueous solvent system. Each spectrum possesses a structured profile originated from well-exfoliated SWNTs. The stable dispersion of SWNT was also confirmed by AFM measurement of the single bilayer of PVA/(SWNT-PSS) film (FIG. 6a). The first layer indeed revealed a limited amount of SWNT absorbed, which enables us to realize the high degree of debundling of SWNT. Bright spots of tens of nanometers in diameter observed for both AFM and SEM images would be carbonaceous and/or metal impurities supposed to be included by 30%, which couldn't be removed by rinsing with acetonitrile unlike aqueous system. In contrast to PEI/PSS polyelectrolytes LBL system, in which the multipoint electrostatic interactions are responsible for the assembly, the initial lag period was observed for ellipsometry measurements of PVA/(SWNT-PSS) LBL (FIG. 5b). The film thickness showed linear growth after the deposition of 3 bilayers and the average thickness increment of PVA/(SWNT-PSS) bilayer after 4th bilayer was estimated to 0.85 nm. This value was considerably small compared to electrostatic PEI/(SWNT-PSS) LBL system (6.8 nm per single bilayer) prepared under the same condition possibly due to the absence of a traditional electrostatic interaction. Regardless of the initial slow growth of the film thickness, a certain degree of accumulation of SWNT strands makes the film conductive to form well-networked structure as shown in FIG. 5b. Such an extensive 3D network is necessary for the formation of efficient charge-transfer pathways since the electrical conductivity of the SWNT-polymer composite film is dominated by charge percolation.

Figure 4:
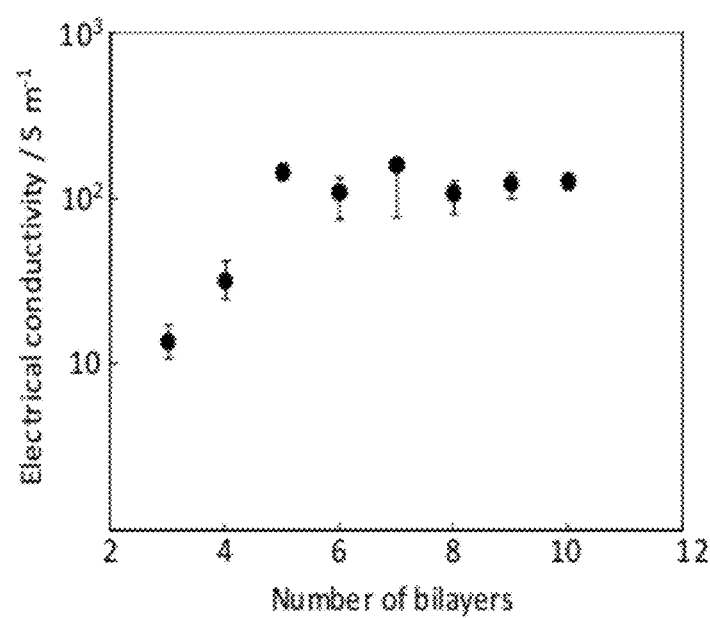
FIG. 4 illustrates a graph representing electrical conductivity of [PVA/(SWNT-PSS)]$_n$ LBL film as a function of bilayer number.

After deposition of 3 bilayers of PVA/(SWNT-PSS), the film had enough density of SWNT to reach the percolation threshold, giving the surface resistivity of about 4.5 MΩsq which could be converted to the conductivity of 10 S/m by using the value of film thickness estimated by ellipsometry (FIG. 4). As more LBL layers are added, the conductivity increases to the order of $10^2$ S/m. The conductivity in the range of $10^2$ S/m with optical transmittance as high as 98% at 600 nm is almost comparable to those of PVA/(SWNT-PSS) LBL composites prepared by aqueous system.

We have introduced first LBL formation from ionic liquid solutions as a non-aqueous system and demonstrated that ionic liquid could be used as an alternative for water. PEI and PSS were deposited in a LBL fashion by alternate spin coating. Multipoint electrostatic interaction between oppositely charged polyelectrolytes seems to be still effective as a driving force of assembly even in ionic liquid with extremely high ionic strength as well as the specific affinity of PVA with aromatic compounds. SWNTs were successfully loaded in the thin film by LBL deposition with PVA, giving the composite film with high conductivity and transparency. The processes were carried out entirely in non-aqueous system, which would greatly extend the usability of LBL for electronic applications.

Example 2

Methods for Preparing Cellulose Thin Films

Methods and Materials. 1-Ethyl-3-methylimidazolium acetate (EMImOAc) was purchased from Sigma-Aldrich, (St. Louis, Mo., USA) and used as received. Whatman No. 1 filter paper (98% cotton) was obtained from Fisher Scientific and ground prior to dissolution in (EMImOAc) or preparation of CellNCs. 50 mg of ground paper was dispersed in 5 mL of (EMImOAc) and the mixture was heated with stirring at 70° C. After stirred for about 2 hours, a transparent cellulose solution with a concentration of 10 mg/mL was obtained and the solution was further stirred for 24 hours at that temperature. CellNCs can be prepared according to the method as reported previously.

Cellulose films can be prepared by spin-coating of cellulose solution of (EMImOAc) onto a silicon wafer or a glass slide followed by rinsing with ethanol to coagulate cellulose film on the substrate as well as remove ionic liquid. Briefly, for fabrication of a free-standing film, 50 μL of viscous cellulose solution (10 mg/mL) was placed on top of a sacrificial cellulose acetate layer with a speed of 5000 rpm on a spin coater (Laurell Technologies, North Wales, Pa., USA) for 30 seconds. The sacrificial layer was deposited on the silicon wafer from a 1 wt % acetone solution prior to the preparation of cellulose film. The thin layer of cellulose solution was then rinsed with ethanol in a dipping manner for 1 min and dried with spinning (5000 rpm) for 1 min. The deposition process was repeated until the film was layered with a plurality of layers to desired thickness. The regenerated cellulose film was obtained by dissolving the sacrificial layer in acetone.

The growth of multilayer films was tracked with ellipsometry. Ellipsometry measurements can be performed using a BASE-160 Spectroscopic Ellipsometer produced by J. A. Woollam Co., Inc. (Lincoln Nebr., USA). The surface morphology of the obtained film was characterized by atomic force microscopy (AFM, Nanoscope III, Digital Instruments/Veeco Metrology Group, Santa Barbara, Calif., USA) and scanning electron microscopy (SEM), (FEI Nova Nanolab, Hillsboro, Oreg., USA). For SEM, the sample was coated with a thin layer of gold using a vacuum gold ion sputterer to avoid the charging effect on the sample with the electron beam. Optical transmittance spectrum for a free-standing film was measured by using an Olympus BX-51 optical microscope with an objective lens (Olympus, ×10, NA 0.3) connected with a Hamamatsu PMA-11 photodetector (Hamamatsu, Bridgewater, N.J., USA) with an optical fiber. X-ray diffraction measurements can be carried out by using a Rigaku RINT-TTR III/NM (Rigaku The Americas, The Woodlands, Tex., USA) Fourier transform infrared (FT-IR) spectra can be recorded on a Jasco FT/IR 4200 spectrometer (Jasco, Easton, Md., USA). The mechanical properties can be tested using a Nanoinstruments NanoIndenter II model provided by MTS Nanoinstruments Inc., (Oak Ridge, Tenn., USA). A Berkovoich shape indenter was used.

Results and Discussion. EMImOAc was chosen as an ionic liquid solvent since it shows the great solubility for cellulose and relatively low viscosity compared to chloride-based ionic liquids. Cotton wool prepared from a filter paper was thermally dissolved in (EMImOAc) and gave a clear solution after stirring for 2 hours at 70° C. Cellulose film was successfully deposited on a solid substrate by the spin-casting the cellulose-EMImOAc solution followed by applying a solution of ethanol as a coagulation step between layering. The dry cellulose film was stable in most solvents including water, ethanol, acetone, chloroform, etc. A single layer of cellulose was deposited on a silicon wafer coated with an ultra uniform polyethyleneimine (PEI) layer and the surface structure was observed by atomic force microscopy (AFM). As seen from a typical AFM image, the regenerated cellulose film coagulated and rinsed in ethanol exhibited very smooth surface structure, which was completely different from that of CellNCs film consisting of densely assembled nanorods with 100-300 nm long and 5 nm in diameter. Small pores observed on the surface would be formed during the coagulation process by diffusing of solvent molecules, ionic liquid and ethanol as shown in FIG. 7.

The surface morphology of regenerated cellulose film was strongly affected by the coagulation solvents. Coagulation and rinse in acetonitrile led to the significant degree of aggregation of cellulose, giving a nonuniform and opaque film. While water treatment was also used for the coagulation of cellulose, the slow evaporation of water resulted in the less uniform and less transparent film. The miscibility and affinity with both the cellulose and (EMImOAc) would have an impact on the regenerated cellulose microstructure.

Since the solubility of cellulose in (EMImOAc) was negligible at ambient temperature, the further layers are deposited by a repetitive adsorption/coagulation/drying process as reported for silk and collagen. The growth of the film was measured by ellipsometry (see FIG. 8). The film thickness of regenerated cellulose increased linearly with the correlation coefficient of almost unity, which is typical for spin-assisted LBL. The average thickness per layer was estimated to be 152±10 nm. The thickness of a layer could be tuned by the spinning conditions, such as concentration of cellulose and spin speed.

Ten layers deposition on a cellulose acetate sacrificial layer under this condition (1.0 mg/ml cellulose-ionic liquid solution, spinning at 5000 rpm) followed by the dissolution of the sacrificial layer provided a free-standing film. The free-standing film was strong enough to be easily handled with tweezers, rolled, folded and/or curved without damage even though it was made from a completely organic compound. As shown in FIG. 9a, the free-standing film exhibited fairly high transparency and the optical transmittance in the visible region was measured as high as 96% (average transmittance=91%). Since the regenerated cellulose didn't show any absorbance and the scattering was also negligible, the optical transmittance spectrum of the free-standing film showed a typical profile for those of transparent thin films (FIG. 10). Without wishing to be bound by any particular theory, it is believed that these oscillations originate from the interference between light reflected from both surfaces of the thin film. The surface morphology of the free-standing film was also quite different from those of LBL films of CellNCs. The regeneration in (EMImOAc) fused microfibrils of natural cellulose into a homogeneous macrostructure. The absence of mesoscopic structures like nanorods or nanowires appears to result in the highly transparency of the film. Enhancement of optical transparency has been previously shown to be achieved by down-sizing of cellulose nanofibers. Others have shown a translucent film prepared by a simple filtering of cellulose extracted from wood flour followed by a combination of compressing and heating. This compression-heating fabrication process significantly affects the optical properties of resulting film. The compression-heated translucent film was mechanically polished to give a transparent film with transmittance 71.6% at 600 nm (thickness=55 µm). The thickness of the free-standing film was measured to be 1.8±0.1 µm by SEM.

The molecular structure of cellulose was then investigated by XRD and FT-IR measurements. The CellNCs showed a XRD profile with peaks at 14.9°, 16.2° and 22.7° (FIG. 11(A)(a)), which is consistent with the typical profile for cellulose I crystal. The present film produced in according to embodiments of the present technology provided a regenerated cellulose film that exhibited a weak and broad peak at around 22° (FIG. 11(A)(b)) despite the same source as CellNCs, suggesting that the regenerated cellulose film has amorphous structure with a small degree of cellulose II structure. Dissolution of cellulose in (EMImOAc) effectively debundled the cellulose microfibrils into almost individual molecules. Comparing the O—H vibration peaks of FT-IR spectra, the peak for CellNCs sample was sharper than that of regenerated cellulose film. The narrow peak for O—H vibration of CellNCs indicates the high regularity and uniformity of the mode of hydrogen bonding in the crystalline structure. On the other hand, the regenerated cellulose film gave a broad peak in the O—H vibration region. While the peak also appeared at lower frequency compared to free hydroxyl due to the hydrogen bonding, the peak broadness suggests the variety and randomness of hydrogen bonding mode in the film, which is in good agreement with the result of XRD measurement.

The free-standing film was cut into thin strips by a razor and subjected to a standard stretching test in order to obtain stress ($\sigma$)-strain ($\in$) curves. FIG. 12 shows a typical stress-strain response of the regenerated cellulose film (thickness=1.8±0.1 µm), from which the values for ultimate stress ($\sigma_{UTS}$), Young's modulus (E) and fracture strain ($\in$) could be determined to be 248±8.0 MPa, 4.9±0.8 GPa and 16±7.0%, respectively. Thus the cellulose film exhibits the high tensile strength as well as the moderate extensibility. These values are significantly improved compared with the LBL film made from CellNCs with a cationic polymer ($\sigma_{UTS}$=128±35 MPa, E=2.8±0.9 GPa and $\in$=6.1±1.7%). For the CellNCs LBL film, poly(diallyldimethyl-ammoniumchloride) (PDDA) was used for a counter polyelectrolyte polymer to bond each negatively charged CellNC. The relatively weak mechanical property of PDDA ($\sigma_{UTS}$~12 MPa, E~0.2 GPa) and the poor adhesion between CellNCs would result in the weaker mechanical property.

The present cellulose film possesses the hydrogen bonding network covering a whole film to give the uniformity in the molecular level. Regardless of the reduced crystallinity, the absence of the interface or boundary between domains is believed to result in the higher strength and also to contribute to the moderate extensibility. The tensile strength of the present cellulose film is also stronger than that of the regenerated cellulose film prepared by using a simple casting from 1-allyl-3-methylimidazolium chloride solution ($\sigma_{UTS}$=138 MPa), whereas the both films should basically have the same structure. The fabrication process would have a certain effect on the macroscopic mechanical properties of the regenerated cellulose film. The shear stress during the spinning process forces the cellulose molecules spread laterally and the rapid coagulation by dipping in ethanol leads to the formation of the film with uniformly connected hydrogen-bonding network, resulting in the high tensile strength. The quickness of the coagulation process, which also affects the quality of the film, depends on the thickness of the layer because it includes the removal or the release of ionic liquid molecules from the gel-like cellulose phase to generate micropores as observed in FIG. 7. By using the spin-assisted LBL method, the thickness of each layer can be easily controlled by spinning conditions and the entire thickness of the film is also precisely controllable by means of the number of deposition cycles.

Conclusions. Regenerated cellulose film was successfully prepared by using spin-assisted LBL method from an ionic liquid (EMImOAc) solution comprising cellulose derived from filter paper. The regenerated cellulose film exhibited good mechanical properties and high optical transparency as high as 92% for 1.8 µm-thick free-standing film. Given the natural origin together with the transparency and excellent mechanical properties, the present cellulose film has wide potential applications not only as coatings for optical and electronic devices but also as biocompatible materials. The combination of CellNCs with the present regenerated cellulose film would further reinforce the mechanical properties of the film, mimicking the microfibrils in plant cells consisting of cellulose crystals and amorphous regions which link the crystalline domains.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Non-Limiting Discussion of Terminology.

The headings (such as "Introduction" and "Summary") and sub-headings used herein are intended only for general organization of topics within the present disclosure, and are not intended to limit the disclosure of the technology or any aspect thereof. In particular, subject matter disclosed in the "Introduction" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

As used herein, the words "desire" or "desirable" refer to embodiments of the technology that afford certain benefits, under certain circumstances. However, other embodiments may also be desirable, under the same or other circumstances. Furthermore, the recitation of one or more desired embodiments does not imply that other embodiments are not useful, and is not intended to exclude other embodiments from the scope of the technology.

As used herein, the word "include," and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present technology that do not contain those elements or features.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components or process steps, the present technology also specifically includes embodiments consisting of, or consisting essentially of, such materials, components or processes excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, all compositional percentages are by weight of the total composition, unless otherwise specified. Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

"A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

What is claimed is:

1. A method for layer-by-layer assembly of a material comprising:
   (a) applying a first composition comprising a first ionic liquid having a melting point at or below room temperature and a first layering material to a surface to form a first layer; and
   (b) applying a second composition comprising a second ionic liquid having a melting point at or below room temperature and a second layering material to the first layer to form a second layer, wherein the first composition and the second composition are compositionally distinct from one another.

2. The method of claim 1, further comprising applying the first composition comprising the first ionic liquid and the second composition comprising the second ionic liquid in an alternating fashion to form a plurality of distinct layers.

3. The method of claim 1, further comprising applying a third composition comprising a third ionic liquid and a third layering material to the second layer to form a third layer.

4. The method of claim 1, further comprising modifying the surface to impart a charge prior to step (a).

5. The method of claim 1, further comprising at least one of:
   rinsing the first layer with a first wash solution prior to step (b); and
   rinsing the second layer with a second wash solution after step (b).

6. The method of claim 1, wherein the applying in step (a) or step (b) includes spin coating.

7. The method of claim 1, further comprising stabilizing at least one of the first layer or the second layer by drying, crosslinking, or irradiating.

8. The method of claim 1, wherein at least one of the first ionic liquid and the second ionic liquid comprises an organic cation and an organic anion.

9. The method of claim 1, wherein the first layering material is soluble in the first ionic liquid and the second layering material is soluble in the second ionic liquid.

10. The method of claim 1, wherein the first layering material is a first polyelectrolyte and the second layering material is a second polyelectrolyte.

11. The method of claim 1, wherein the first layering material and the second layering material have an affinity for each other.

12. The method of claim 1, wherein one of the first layering material and the second layering material comprises poly(ethyleneimine) and the other one of the first layering material and the second layering material comprises poly(sodium-4-styrenesulfonate).

13. The method of claim 1, wherein the surface comprises the second layering material.

14. The method of claim 1, wherein the surface is a surface of a sacrificial substrate that is soluble in a solvent, wherein the first layering material and second layering material are not substantially soluble in the solvent.

15. The method of claim 1, wherein the first ionic liquid and the second ionic liquid are the same, but the first layering material and the second layering material are distinct from one another.

16. The method of claim 1, wherein the first layering material and the second layering material are the same, but the first ionic liquid and the second ionic liquid are distinct from one another.

17. The method of claim 1, further comprising applying a solution to the first layer that coagulates or precipitates the first layering material prior to step (b).

18. The method of claim 1, wherein the first layering material and the second layering material comprise cellulose.

19. The method of claim 18, further comprising applying a solution comprising ethanol to each layer, wherein the solution coagulates or precipitates the cellulose.

20. The method of claim 19, further comprising applying the first composition and the second composition in an alternating fashion to form a plurality of distinct layers, wherein the solution comprising ethanol is applied to each layer to coagulate or precipitate the cellulose.

21. A method for layer-by-layer assembly of a material comprising:
   (a) applying a first composition comprising a first ionic liquid having a melting point at or below room temperature and a first layering material to a surface to form a first layer; and
   (b) applying a second composition comprising a second ionic liquid having a melting point at or below room temperature and a second layering material to the first layer to form a second layer, wherein the first composition and the second composition are compositionally distinct from one another and the first ionic liquid comprises a first charged species selected from the group consisting of organic cations, organic anions and inorganic anions, and the second ionic liquid comprises a second charged species having an opposite charge from the first charged species selected from the group consisting of organic cations, organic anions and inorganic anions.

22. A method for layer-by-layer assembly of a material comprising:
   (a) applying a first composition comprising a first ionic liquid and a first layering material to a surface to form a first layer; and
   (b) applying a second composition comprising a second ionic liquid and a second layering material to the first layer to form a second layer, wherein the first composition and the second composition are compositionally distinct from one another and the first ionic liquid and the second ionic liquid are independently selected from the group consisting of: imidazolium, pyridinium, pyridazinium, pyrimidinium, pyrazinium, pyrazolium, oxazolium, 1,2,3-triazolium, 1,2,4-triazolium, thiazolium, piperidinium, pyrrolidinium, quinolinium, isoquinolinium, trifluoromethylsulfonate, bis(trifluoromethylsulfonyl)imide, bis(perfluoroethylsulfonyl)imide, tris(trifluoromethylsulfonyl)methide, tetrafluoroborate, hexafluorophosphate, hexafluoroantimonate, hexafluoroarsenate, 1-Ethyl-3-methylimidazolium chloride, 1-Ethyl-3-methylimidazolium methanesulfonate, 1-Butyl-3-methylimidazolium chloride, 1-Butyl-3-methylimidazolium methanesulfonate, Methyl-tri-n-butylammonium methylsulfate, 1,2,4-Trimethylpyrazolium methylsulfate, 1-Ethyl-2,3-di-methylimidazolium ethylsulfate, 1,2,3-Trimethyl-imidazolium methylsulfate, Methylimidazolium chloride, Methylimidazolium hydrogensulfate, 1-Ethyl-3-methylimidazolium hydrogensulfate, 1-Ethyl-3-methylimidazolium tetrachloroaluminate, 1-Butyl-3-methylimidazolium hydrogensulfate, 1-Butyl-3-methylimidazolium tetrachloroaluminate, 1-Ethyl-3-methylimidazolium acetate, 1-Butyl-3-methylimidazolium acetate, 1-Ethyl-3-methylimidazolium ethylsulfate, 1-Butyl-3-methylimidazolium methylsulfate, 1-Ethyl-3-methylimidazolium thiocyanate, 1-Butyl-3-methylimidazolium thiocyanate, Choline acetate, Choline salicylate, Tris-(2-hydroxyethyl)-methylammonium methylsulfate, and combinations thereof.

* * * * *